US008903912B2

(12) United States Patent
Brown

(10) Patent No.: US 8,903,912 B2

(45) Date of Patent: Dec. 2, 2014

(54) SOCIAL CONTENT MANAGEMENT

(75) Inventor: Douglas A. Brown, Sarasota, FL (US)

(73) Assignee: Dynamic Signal Inc., San Bruno, CA (US)

(*) Notice: Subject to any disclaimer, the term of this patent is extended or adjusted under 35 U.S.C. 154(b) by 48 days.

(21) Appl. No.: 13/475,496

(22) Filed: May 18, 2012

(65) Prior Publication Data

US 2012/0296971 A1 Nov. 22, 2012

Related U.S. Application Data

(60) Provisional application No. 61/488,267, filed on May 20, 2011.

(51) Int. Cl.
*G06F 15/16* (2006.01)
*G06Q 50/00* (2012.01)

(52) U.S. Cl.
CPC .................................... *G06Q 50/01* (2013.01)
USPC ........... 709/204; 709/203; 709/219; 709/224; 707/715; 707/706; 707/769; 707/781; 707/783

(58) Field of Classification Search
CPC ...... H04L 67/306; H04L 12/588; H04L 51/32
USPC .......................... 709/204, 217, 203, 219, 224
See application file for complete search history.

(56) References Cited

U.S. PATENT DOCUMENTS

| | | | | |
|---|---|---|---|---|
| 7,027,461 | B1 * | 4/2006 | Bontempi | 370/443 |
| 7,966,369 | B1 | 6/2011 | Briere et al. | |
| 2006/0074727 | A1 | 4/2006 | Briere et al. | |
| 2010/0174709 | A1 * | 7/2010 | Hansen et al. | 707/728 |
| 2010/0287256 | A1 * | 11/2010 | Neilio | 709/217 |
| 2012/0076367 | A1 * | 3/2012 | Tseng | 382/118 |

* cited by examiner

*Primary Examiner* — Jude Jean Gilles
(74) *Attorney, Agent, or Firm* — Patent GC LLC

(57) ABSTRACT

A method includes, in a server residing in a network of interconnected computers, populating a repository with content, each one of the content categorized by at least one community designation, one topic designation, one tag and/or one company designation, receiving registration information for users, the registration information including a username and at least one community designation, one topic designation, one tag and/or one company designation, receiving content from a first user, the content including at least one community designation, one topic designation, one tag and/or one company designation, storing the received content in the repository, and notifying a subset of users of the received content, the community designation, topic designation, tag and/or company designation of each of the subset of users matching the community designation, topic designation, tag and/or company designation of received content.

17 Claims, 2 Drawing Sheets

SOCIAL CONTENT MANAGEMENT

CROSS-REFERENCE TO RELATED APPLICATIONS

This application claims priority to U.S. Provisional Patent Application Ser. No. 61/488,267, entitled "Social Content Management," filed May 20, 1011, which is incorporated herein by reference in its entirety.

BACKGROUND OF THE INVENTION

The invention generally relates to social networks, and more specifically to social content management.

In general, a social network, such as Facebook®, LinkedIn® and Myspace®, is a social structure made up of individuals (or organizations) called "nodes," which are tied (connected) by one or more specific types of interdependency, such as friendship, kinship, common interest, financial exchange, dislike, sexual relationships, relationships of beliefs, knowledge, prestige and so forth.

A social network typically enables a user to connect with friends and family, share photos, videos, music and other personal information with either a select group of friends or a wider group of people, depending on the settings the user selects. Social networks are great ways of keeping in touch with friends and family around the world as well as making new connections with people based on similar interests or professions.

In a typical social network, users drive content.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for social content management.

In general, in one aspect, the invention features a method including, in a server residing in a network of interconnected computers, populating a repository with content, each one of the content categorized by at least one community designation, one topic designation, one tag and/or one company designation, receiving registration information for users, the registration information including a username and at least one community designation, one topic designation, one tag and/or one company designation, receiving content from a first user, the content including at least one community designation, one topic designation, one tag and/or one company designation, storing the received content in the repository, and notifying a subset of users of the received content, the community designation, topic designation, tag and/or company designation of each of the subset of users matching the community designation, topic designation, tag and/or company designation of received content.

Other features and advantages of the invention are apparent from the following description, and from the claims.

BRIEF DESCRIPTION OF THE DRAWINGS

The invention will be more fully understood by reference to the detailed description, in conjunction with the following figures, wherein.

DETAILED DESCRIPTION

Figure 1:
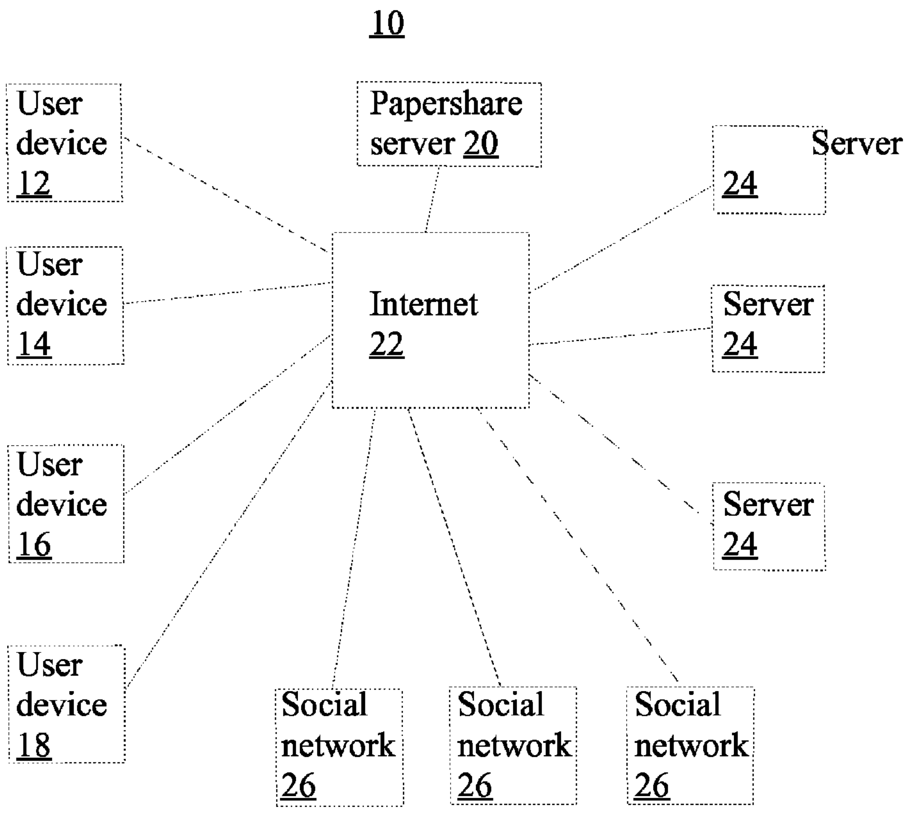
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, an exemplary network 10 includes a number of user devices 12, 14, 16, 18 linked to a papershare server 20 through a group of interconnected computers, e.g., the Internet, 22. The network 10 also includes one or more servers 24 linked to the Internet 22 and one or more social networks 26 linked to the Internet 22. Example user devices include personal computers (PCs), netbook computers, laptop computers, smartphones, tablet PCs, and so forth.

Figure 2:
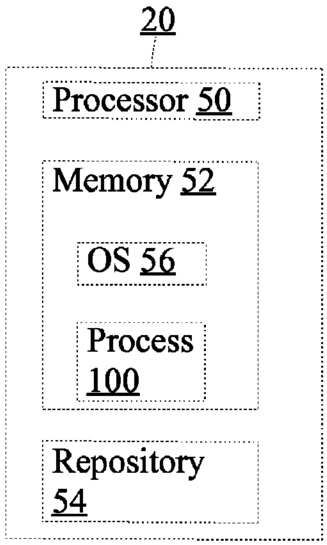
FIG. 2 is a block diagram.

As shown in FIG. 2, the papershare server 20 includes a processor 50, a memory 52 and a store or repository 54. The memory 52 includes an operating system (OS) 56, such as Windows® or Linux®, and a papershare process 100, fully described below. The repository 54 stores content uploaded from one or more of the user devices 12, 14, 18, 18. Content can include white papers, solution briefs, technical guides, audio, video, audio/video, software, marketing materials, data sheets, press releases, infographics, webinars, events, and so forth. Content residing in the repository 54 can be shared users registered with the papershare server 20. For example, one user's content can be shared with other users that may be classified as friends, customers, companies, colleagues, and so forth.

Each piece of content residing in the repository 54 is categorized by at least a community, one or more topics, one or more tags and/or one or more companies. A community refers to a particular market while a topic represents particular aspects of the market. Example communities include computing, financial services, healthcare, manufacturing, sustainability, and so forth. A tags represents an aspect of a topic. Example tags include cloud, virtualization, healthcare, and so forth. Companies enable a user to filter search results withing a community using boolean search terms. Example companies include Intel Corporation, Microsoft Corporation, VMware, and so forth. Thus a user can find content, users, and companies with an interest in a specific aspect of a market quickly.

Figure 3:
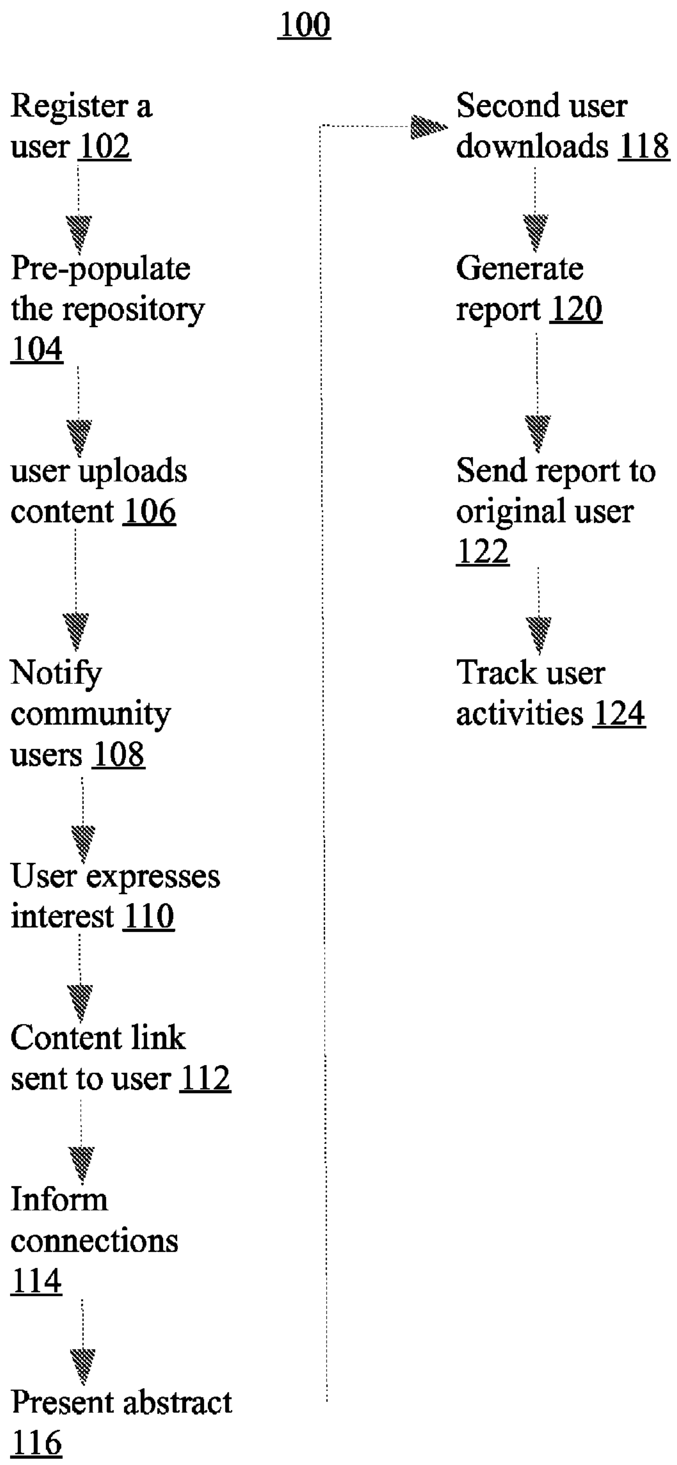
FIG. 3 is a flow diagram.

As shown in FIG. 3, process 100 includes registering (102) a user. When a user first registers with the papershare server 20, the registration process requires the registrant to select at least one community and at least one topic to which they are associated with. This initial selection of one community and one topic enables the papershare process 100 to present only content, people, companies the user is interested in while reducing all non-important noise experienced in traditional user centric social networks.

Process 100 pre-populates (104) the repository 54 with a list of approved communities. In some implementations, one or more users may generate their own private communities. These private communities that are user generated enables users an ability to create focused environments on their own through, for example, a simple graphical user interface (GUI) web page. These private communities are placed in a user-generated section of the repository 54 to segregate approved communities from user-created communities. One benefit of this separation of approved and private communities allows the maintenance of a list of all communities without duplicates, offensive communities, and/or potential noise.

A user creates a private community by naming the community and associating the community with one or more topics, tags, and/or list of companies. The user who creates the private community becomes the owner who can add, edit, and remove topics, tags, and companies.

Approved communities are listed in the repository 54 in a public list and viewable by all users while private communities are not listed in the public list of communities and the owner of the community is required to personally invite users to join such a private community. Once a user has joined a private community, the private community is added to a list of communities the user has access to.

The papershare server 20 and papershare process 100 is not a one-to-one relationship but enables a one-to-many and a many-to-one relationship. For example, a user can upload (106) content, such as a paper, to the repository 54. Once uploaded, the paper is available to any number of other users. Users with interest within a subcategory of a community are notified (108) of the newly uploaded content by the papershare process 100. The notification can be via an activity status update, a dashboard notification, an individual or daily notification email, with an invitation as to whether any other user wants access to this newly uploaded content. If a user is interested (110) in the newly uploaded content, a copy (112) of the new loaded content becomes theirs through an alert and/or link, which may also trigger additional information about the content. At that time the user can read a copy of the content or place the content in their personal repository of content, referred to as "My Library" in the repository 54. At no time does the user have to go out to the one or more servers 24 to find the content and download the content. Once the user has the content, all of the user's "connections" are informed (114) that the user has the content and can also make the content theirs.

In some implementations, a user may have a papershare widget, a papershare phone app, a papershare tablet app, and so forth, installed on their user device, which is used to open their "My Library," similar to Windows® Explorer and Mac® Finder. In one example, a user can use a widget to put a papershare bookshelf on their own web site. In general, a widget is the word widget is self-contained code that displays a program, or a piece of a program, that is also (usually) a shortcut to a larger application. In general, an app is an application developed for small handheld devices, such as mobile phones, smartphones, PDAs and so on, and for tablet PCs. Apps can come preloaded on a user device as well as downloaded by users from app stores or the Internet.

For example, a papershare widget enables a user to interact with the papershare server 20 as may be presented on a third party web site, applications, and/or any platform/device that allows for displaying HyperText Markup Language (HTML) and supports Javascript®. The papershare widget can be configured to point to a customer/user's library or the repository 54. The widget presents a viewer with all the content from the configured library where a user can click to view read the content, add it to their personal library, share it with friend, and send it to the one or more one or more social networks 26, such as Facebook®, LinkedIn®, Twitter®, and so forth. The user is presented (116) with an abstract of the content, the owner's biography and other content the owner has uploaded and/or added to their personal library, and a list of all the users who have downloaded the content. The user can then click on an image of the owner who downloaded the content to view more about that user.

A universal resource locator (URL) can provide the content and be accessed from the widget. This means the a user can upload their content to the papershare server 20 and it will not only be published to the web site but also to the widget and any other clients that have built upon the papershare API. When a user views content through any of these clients, they also can see all the social information about the document, who downloaded it, any messages, recommendations, ratings, and so forth. When a user access the content through the papershare widget or API, the client is authenticated in the app or on the web site the widget is embedded on.

Content may be published to a server from within an application that creates the content (e.g., Adobe® Acrobat or Microsoft® Word), which creates a line of code that can be placed on a web page and act like a widget. For example, a user can click on a plugin and is then presented to login to the papershare server 20 and enter the required name, description and then categorize the content that is added to the network.

Advertisements on web sites located on the one or more servers 24 may include links to the papershare server using, for example, an application programming interface (API).

Users can build apps that interact with the papershare server 20. This enables users to interact with content in new and dynamic ways. The API allows users to develop applications (both web and GUI based, on any platform) to upload, download, review, recommend, share (both internally and externally), and connect with people and companies associated with the papershare server 20.

When a second user downloads (118) content, a detailed report is generated (120) and sent (122) to the original user who uploaded the content. Contained within the detailed report is information, such as a profile, about the second user who downloaded the content. As other users, e.g., a third, fourth and fifth user, download the same content from the second user, detailed reports are to the original user. The process 100 tracks (124) everything a user does from the pages they visit to the content they download, recommend, rate, share, review (leave a comment) or post to a third party social environment. This tracking occurs not only on the papershare server 20 but also their papershare widgets, mobile apps and any app developed using the papershare API.

Detailed reports can include various statistics for future analysis. The statistics can include, for example, the number of content views, shares and/or downloads, the number of recommendations, the type of download user, the frequency of downloads, trending data, social data around users, and so forth. Process 100 enables a user to view user histories. A user history can include everything a user has "publicly" done on the papershare server 20.

When a user uploads content, the user may tag that content. For example, the tag may include the subject or the source. The key piece of process 100 is the fact that we require all content to be categorized. When a user uploads the content they are required to assign the content to the community, topic, tag and/or company. Once a piece of content is categorized a user can use a list of topics, tags, and companies to quickly find content they are looking for using boolean operators. The list of topics, tags and companies are based on the community the user is in. At the highest level, a user can join different communities and when they visit the community they view only the content that is part of such community. When the community is created the community creator configures the list of topics, tags and companies. These topics, tags and companies can be added, edited, or removed at any time by the administrator of the community.

A goal is to reduce the noise associated with creating libraries of content. A user sees only the content they have expressed interest in their topics and tags. For example, if K is a member of community A and community B and user B is a member of community A but not community B, then when K looks at the user's content library or a customer's content library, K is only presented with the content for community A as we share this interest. Again, this reduces noise experience on the other social networks and environments where content is not finely actualized.

Uploaded content or pages can be labeled public or private. Public content is available to anyone without registering with the papershare server 20. Public content is optimized for search engines, such as Google®, Yahoo!®, and Bing®.

The papershare server 20 may be implemented in a number of different ways. One way, as described above, is on a customer web site. In another example, the papershare server 20 is implemented on the Microsoft® Windows Azure platform, for example. In general, the Windows® Azure platform includes a cloud services operating system and a set of developer services, which provide the functionality to build applications that span from consumer web to enterprise scenarios. Windows Azure and SQL Azure are the key components of the Windows® Azure platform.

Windows Azure provides developers with on-demand compute, storage, networking and content delivery capabilities to host, scale and manage Web applications on the Internet through Microsoft® data centers. Windows Azure serves as the development, service hosting and service management environment for the Windows Azure platform.

Microsoft® SQL Azure delivers on Microsoft's SQL Server® Data platform vision of extending the Data platform capabilities to the cloud. SQL Azure provides data services, including a relational database, reporting; and data synchronization with mobile users, remote offices and business partners.

The papershare process 100 enables annotation(s) of content, which then is added to the content as an additional layer or layers. This is analogous to presentations in the past using transparencies. These annotations can then be shared along with the original content to other users Annotated content can be requested by a user and the user can select which annotations should be included, like only those from a particular user or users, or in a particular category, and so forth. And annotations can be added to previous annotations. Annotations provide a way that two or more users may collaborate on content.

Uploaded content can be protected by attaching security, such as private, public, and/or anonymous. (Anonymous content does not require the user to be registered with the papershare server 20.

Content, e.g., documents, stored in the repository 54 can be searched based on categories, attributes, similarities, authorship, the content of the document or zip file, and so forth. Content found in response to a search can be shared with other users, recommended, sent to other social networks and so forth.

A user can recommend specific content. Other users can search for content based on recommendations from a particular user. In one specific example, a user recommends specific content by clicking on a recommendation button in a papershare user interface (UI). Other users can search on recommended papers, and recommended papers with specific authors or within specific groups. Here again, content drives users, users do not drive content.

The papershare server 20 includes a messaging system that enables receiving, sending and managing messages, and also take a message and reply through status updates. This puts the message into the public realm.

When content is uploaded, a status update is generated, and the status update can be sent out of a number of traditional media, such as Facebook®, LinkedIn®, Twitter®, and so forth. In effect, the papershare server 20 becomes a client to this traditional media. If a status update exceeds the maximum number of characters allowed in a text message used in, for example, Twitter®, the papershare process 100 warns the user.

Since the papershare server 20 provides a repository 54 of content, users may directly access the repository 54 and add, copy and delete content. For example, files can be dropped into the repository 54 and a status update generated, sometimes in response to further user input.

The repository 54 can also include content that is pay for view and the papershare server 20 can store information regarding payment.

In one embodiment, the papershare server 20 includes a live chat feature. If a user has a question about content, and the owner who uploaded it is online, the user may initiate a chat session with the owner. The chat session session may include voice and/or video. In general, chat refers to a real time communication between two users via computer. Further, the papershare server 20 can enable conferencing among multiple users who have downloaded the content may be initiated.

As described above, the papershare server 20 is built around verticals. Verticals include categories. A user can be a member of multiple verticals and content can be a member of multiple verticals. Groups of users can be members of multiple verticals.

A user can find detailed information about users, groups, and so forth, that is associated with any piece of content, including who has downloaded it.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method comprising:

in a server residing in a network of interconnected computers, populating a repository with a plurality of content, each one of the plurality of content categorized by at least one community designation, one topic designation, one tag and/or one company designation;

receiving registration information for a plurality of users, the registration information comprising a username and at least one community designation, one topic designation, one tag and/or one company designation;

receiving content from a first user, the content comprising at least one community designation, one topic designation, one tag and/or one company designation;

storing the received content in the repository;

notifying a subset of users of the received content, the community designation, topic designation, tag and/or company designation of each of the subset of users matching the community designation, topic designation, tag and/or company designation of received content;

receiving a request for the received content from a user in the subset;

tracking the request;

sending a link to the received content to the user;

generating a report of the tracking, the report including user history for the user; and sending the report to the first user.

2. The method of claim 1 wherein the content is selected from the group consisting of white papers, solution briefs, technical guides, audio, video, audio/video, software, marketing materials, data sheets, press releases, infographics, webinars, and events.

3. The method of claim 1 wherein the community designation represents a particular market.

4. The method of claim 1 wherein the topic designation represents particular aspects of a market.

5. The method of claim 1 wherein the tag represents an aspect of a topic.

6. The method of claim 1 wherein notifying comprises sending an abstract of the received content.

7. The method of claim 6 wherein notifying further comprises sending a biography of the first user.

8. The method of claim 1 wherein the registration information comprises a private community designation.

9. The method of claim 1 wherein a user associated with the private community designation manages content associated with the private community designation.

10. The method of claim 1 wherein notifying comprises sending an activity status update, selecting a dashboard notification, sending an email, and/or sending an invitation to receive the content.

11. The method of claim 1 wherein tracking further comprises tracking recommendations of the content, rating of the content, sharing of the content, comments regarding the content and posting of the content to a third party social environment.

12. The method of claim 1 wherein the report comprises statistics.

13. The method of claim 12 wherein the statistics comprise a number of content views, a number of shares, a number of downloads, a number of recommendations, a type of download user, a frequency of downloads, trending data, and social data around users.

14. The method of claim 1 further comprising establishing a chat session between the first user and the user receiving the link.

15. The method of claim 1 further comprising storing the received content on a web server addressable from universal resource locator (URL) and accessible to a user through a widget.

16. The method of claim 15 further comprising enabling the user through the widget to view information associated with the received content, the information including the community designation, topic designation, tag and/or company designation of received content.

17. The method of claim 1 further comprising:

publishing the received content to a server from within an application used to create the content; and generating one or more lines of software code enabling a user to log on to the server having the repository and view the received content with the community designation, topic designation, tag and/or company designation.

* * * * *